US008635049B2

(12) United States Patent
Kauffman et al.

(10) Patent No.: US 8,635,049 B2
(45) Date of Patent: Jan. 21, 2014

(54) LIGHT UNIT WITH LIGHT OUTPUT PATTERN SYNTHESIZED FROM MULTIPLE LIGHT SOURCES

(75) Inventors: Rick Kauffman, Buford, GA (US); Donald Sipes, Colorado Springs, CO (US); Donald VanderSluis, Sarasota, FL (US); Robert Fugerer, Lutz, FL (US)

(73) Assignee: Evolucia, Inc., Sarasota, FL (US)

(*) Notice: Subject to any disclaimer, the term of this patent is extended or adjusted under 35 U.S.C. 154(b) by 58 days.

(21) Appl. No.: 12/981,981

(22) Filed: Dec. 30, 2010

(65) Prior Publication Data

US 2011/0246146 A1 Oct. 6, 2011

Related U.S. Application Data

(63) Continuation of application No. PCT/US2009/049629, filed on Jul. 2, 2009.

(60) Provisional application No. 61/077,747, filed on Jul. 2, 2008.

(51) Int. Cl.
*G06F 17/10* (2006.01)

(52) U.S. Cl.
USPC .......... 703/2

(58) Field of Classification Search
USPC .......... 703/2; 362/227, 249.13, 612, 613
See application file for complete search history.

(56) References Cited

U.S. PATENT DOCUMENTS

| | | | | |
|---|---|---|---|---|
| D199,327 | S | 10/1964 | Guth | |
| 4,041,306 | A | 8/1977 | Compton et al. | |
| 4,694,382 | A | 9/1987 | Sales | |
| 5,865,527 | A | 2/1999 | Lemons et al. | |
| D425,652 | S | 5/2000 | Brok | |
| 6,302,564 | B1 | 10/2001 | Wedell et al. | |
| 6,513,962 | B1 * | 2/2003 | Mayshack et al. | 362/583 |
| 7,261,440 | B2 | 8/2007 | Kwasny | |
| 7,278,761 | B2 | 10/2007 | Kuan | |
| D578,697 | S | 10/2008 | Zheng et al. | |
| 7,434,959 | B1 | 10/2008 | Wang | |
| 7,445,363 | B2 | 11/2008 | Vanden Eynden | |
| 7,637,633 | B2 | 12/2009 | Wong | |

(Continued)

FOREIGN PATENT DOCUMENTS

| | | | |
|---|---|---|---|
| CN | 1404630 | A | 3/2003 |
| CN | 101144589 | A | 3/2008 |

(Continued)

OTHER PUBLICATIONS

Extended European search report; dated Oct. 2, 2012 from Application No. 09774575.6; Applicant Sunovia Energy Technologies, Inc.

(Continued)

*Primary Examiner* — Kamini S Shah
*Assistant Examiner* — Andre Pierre Louis
(74) *Attorney, Agent, or Firm* — Holland & Hart LLP

(57) ABSTRACT

The present disclosure provides an LED based light unit that produces an output lighting pattern that meets desired lighting characteristics using a reduced number of LED elements. The present disclosure provides a number of point sources that are directed into a desired direction such that, when combined with other point sources, a synthesized light output is provided that minimizes the LED headcount.

33 Claims, 18 Drawing Sheets

(56) References Cited

U.S. PATENT DOCUMENTS

| | | | | |
|---|---|---|---|---|
| 7,641,363 | B1 | 1/2010 | Change et al. | |
| D614,791 | S | 4/2010 | Nibaldi | |
| D615,234 | S | 5/2010 | Oblak | |
| D624,685 | S | 9/2010 | Ham et al. | |
| D628,334 | S | 11/2010 | Yamada | |
| 8,251,555 | B2 * | 8/2012 | Pastrick | 362/494 |
| 2006/0203338 | A1 * | 9/2006 | Pezzaniti | 359/465 |
| 2007/0127245 | A1 | 6/2007 | Magarill et al. | |
| 2007/0159819 | A1 * | 7/2007 | Bayat et al. | 362/236 |
| 2007/0253198 | A1 | 11/2007 | Pelegrin | |
| 2008/0062691 | A1 | 3/2008 | Villard et al. | |
| 2009/0213588 | A1 | 8/2009 | Manes | |
| 2010/0002448 | A1 | 1/2010 | Shih | |

FOREIGN PATENT DOCUMENTS

| | | | |
|---|---|---|---|
| CN | 201057603 | Y | 5/2008 |
| CN | 201066094 | Y | 5/2008 |
| JP | 2000507042 | A | 6/2000 |
| JP | 2008108674 | A2 | 5/2008 |
| TW | 321587 | U | 11/2007 |

OTHER PUBLICATIONS

First Office Action for Application No. 200980134138.8 from the State Intellectual Property Office of the People's Republic of China, sent Dec. 31, 2012.

* cited by examiner

LIGHT UNIT WITH LIGHT OUTPUT PATTERN SYNTHESIZED FROM MULTIPLE LIGHT SOURCES

CROSS REFERENCE TO RELATED APPLICATIONS

This application is a continuation of International Patent Application No. PCT/US09/49629 entitled "Light Unit With Light Output Pattern Synthesized From Multiple Light Sources," filed on Jul. 2, 2009, which claims priority to U.S. Provisional Patent Application No. 61/077,747 entitled "Light Unit With Light Output Pattern Synthesized From Multiple Light Sources," filed on Jul. 2, 2008. The entire disclosure of each of these applications is incorporated herein by reference.

FIELD

The present disclosure related to LED-based light units, and more specifically, to an LED-based light unit with a synthesized output pattern using reduced numbers of LED elements and reduced optics.

BACKGROUND

Lighting systems traditionally use various different types of illumination devices, commonly including incandescent lights, fluorescent lights, and Light Emitting Diode (LED) based lights. LED based lights generally rely on multiple diode elements to produce sufficient light for the needs of the particular light or lighting system. As an approach to offset the ever increasing price of energy and make a meaningful indent to the production of greenhouse gases, LED lighting offers great promise in this regard. With efficacies approaching 150 lumens per Watt, and lifetimes at over 50,000 Hours, LEDs and lighting products based on LED technology may potentially make significant inroads in the lighting market in residential and commercial, indoor and outdoor applications.

LED based lights offer significant advantages in efficiency and longevity compared to, for example, incandescent sources and produce less waste heat. For example, if perfect solid-state lighting devices were to be fabricated, the same level of luminance can be achieved by using merely 1/20 of the energy that an equivalent incandescent lighting source requires. LEDs offer greater life than many other lighting sources, such as incandescent lights and compact fluorescents, and contain no environmentally harmful mercury that is present in fluorescent type lights. LED based lights also offer the advantage of instant-on and are not degraded by repeated on-off cycling.

As mentioned above, LED based lights generally rely on multiple LED elements to generate light. An LED element, as is well known in the art, is a small area light source, often with associated optics that shape the radiation pattern and assist in reflection of the output of the LED. LEDs are often used as small indicator lights on electronic devices and increasingly in higher power applications such as flashlights and area lighting. The color of the emitted light depends on the composition and condition of the semiconducting material used to form the junction of the LED, and can be infrared, visible, or ultraviolet.

Within the visible spectrum, LEDs can be fabricated to produce desired colors. For applications where the LED is to be used in area lighting, a white light output is typically desirable. There are two common ways of producing high intensity white-light LED. One is to first produce individual LEDs that emit three primary colors (red, green, and blue), and then mix all the colors to produce white light. Such products are commonly referred to as multi-colored white LEDs, and sometimes referred to as RGB LEDs. Such multi-colored LEDs generally require sophisticated electro-optical design to control the blend and diffusion of different colors, and this approach has rarely been used to mass produce white LEDs in the industry to date. In principle, this mechanism has a relatively high quantum efficiency in producing white light.

A second method of producing white LED output is to fabricate a LED of one color, such as a blue LED made of InGaN, and coating the LED with a phosphor coating of a different color to produce white light. One common method to produce such and LED-based lighting element is to encapsulate InGaN blue LEDs inside of a phosphor coated epoxy. A common yellow phosphor material is cerium-doped yttrium aluminum garnet (Ce3+:YAG). Depending on the color of the original LED, phosphors of different colors can also be employed. LEDs fabricated using such techniques are generally referred to as phosphor based white LEDs. Although less costly to manufacture than multi-colored LEDs, phosphor based LEDs have a lower quantum efficiency relative to multi-colored LEDs. Phosphor based LEDs also have phosphor-related degradation issues, in which the output of the LED will degrade over time. Although the phosphor based white LEDs are relatively easier to manufacture, such LEDs are affected by Stokes energy loss, a loss that occurs when shorter wavelength photons (e.g., blue photons) are converted to longer wavelength photons (e.g. white photons). As such, it is often desirable to reduce the amount of phosphor used in such applications, to thereby reduce this energy loss. As a result, LED-based white lights that employ LED elements with such reduced phosphor commonly have a blue color when viewed by an observer.

Various other types of solid state lighting elements may also be used in various lighting applications. Quantum Dots, for example, are semiconductor nanocrystals that possess unique optical properties. The emission color of quantum dots can be tuned from the visible throughout the infrared spectrum. This allows quantum dot LEDs to create almost any output color. Organic light-emitting diodes (OLEDs) include an emitting layer material that is an organic compound. To function as a semiconductor, the organic emitting material must have conjugated pi bonds. The emitting material can be a small organic molecule in a crystalline phase, or a polymer. Polymer materials can be flexible; such LEDs are known as PLEDs or FLEDs.

SUMMARY

The present disclosure provides an LED based light unit that produces an output lighting pattern that meets desired lighting characteristics using a reduced number of LED elements. The present disclosure provides a number of point sources that are directed into a desired direction such that, when combined with other point sources, a synthesized light output is provided that minimizes the LED headcount and does not require additional beam-steering optics.

One aspect of the present disclosure provides a lamp assembly, comprising: (a) a housing having a plurality of mounting surfaces, the plurality of mounting surfaces comprising surfaces having a plurality of different angles relative to a first plane that is substantially parallel to a surface that is to be illuminated by the lamp assembly; and (b) at least one solid state light element mounted to each mounting surface, each of at least a subset of the plurality of light elements providing light output along a respective primary axis that intersects a second plane that is perpendicular to the first plane and intersects a centerline of the housing, the output of the plurality of solid state light elements combining to provide a synthesized illumination pattern. In one embodiment, at least one of the plurality of solid state light elements comprises a collimating component that collimates light produced by the associated solid state light element, the collimating component may collimate light output by the solid state light element to a beam angle of 5° or less. In an embodiment, light provided by the solid state lighting element is collimated to provide an angular intensity that is substantially equivalent to the angular intensity of the other of the plurality of solid state lighting elements. The illumination pattern of the lamp assembly of various embodiments has a uniformity greater than uniformity provided by incandescent or gas discharge lamps. In some embodiments, the illumination pattern is asymmetrical relative to the lamp assembly.

In one embodiment, the lamp assembly includes mounting surfaces that comprise a first plurality of mounting surfaces and a second plurality of mounting surfaces, the first plurality of mounting surfaces having, on average, smaller angles relative to the second plane than the second plurality of mounting surfaces. In a further embodiment, solid state lighting elements mounted on the first plurality of mounting surfaces provide illumination for a first area of the illumination pattern, and solid state lighting elements mounted on the second plurality of mounting surfaces provide illumination for a second area of the illumination pattern. In still further embodiments, the first area may be larger than the second area, or the areas may be similar in size but offset.

Another aspect of the disclosure provides a lamp assembly, comprising: (a) a plurality of solid state light elements mounted to the lamp assembly, the lamp assembly configured to provide an illumination pattern and having a primary axis extending substantially perpendicularly from the lamp assembly to a surface to be illuminated by the lamp assembly; and (b) a mounting surface having a plurality of angles relative to the primary axis, with the plurality of solid state light elements mounted on the mounting surfaces and each providing light output along an output axis that is normal to the mounting surface, the output axis of at least a subset of the plurality of the solid state light elements intersecting a plane containing the primary axis and a centerline of the lamp assembly. The output pattern may be asymmetrical relative to a center-line of the lamp assembly. In one embodiment, the asymmetrical output pattern includes a first illumination area and a second illumination area that is smaller than the first illumination area. In another embodiment, the asymmetrical output pattern includes a first illumination area and a second illumination area that is substantially the same area as the first illumination area. In a further embodiment, the first illumination area is offset from the second illumination area. In some embodiments, uplight emitted from the lamp assembly is reduced due to light elements being mounted and directed toward other light elements, thereby allowing the lamp assembly to comply with various "dark sky" goals.

Another aspect of the present disclosure provides a lamp assembly, comprising: (a) a housing having a primary axis extending substantially perpendicularly from the lamp assembly to a surface to be illuminated by the lamp assembly, the housing comprising a plurality of mounting surfaces; (b) a plurality of solid state light elements mounted to the mounting surfaces; (c) a plurality of collimating components mounted to at least a subset of the solid state light elements that collimate light output from respective light elements; and (d) a plurality of spreading optics mounted to at least a subset of the collimating components that spread the light output from the collimating component to a beam width selected based on a distance from the light element of an object to be illuminated by the light element.

A further aspect of the disclosure provides a method for generating a desired illumination pattern from a solid state lighting assembly, comprising: (a) modeling light output from a plurality of different solid state light elements as a vector, the direction of each vector is determined based on the pointing of the central lobe of the respective light element output, and the length of each vector is determined based on the intensity of the peak illumination of the light element; (b) determining a desired intensity pattern that is to be output from the lighting assembly; and (c) determining the direction and length of a plurality of pointing vectors to achieve the desired intensity pattern. In an embodiment, the method further comprises: (d) determining a configuration of a housing for the lighting assembly based on the determined direction and length of the plurality of pointing vectors. In one embodiment, a solid state lighting element and associated collimating element are selected based on the length of the associated pointing vector. An angle of the surface to which the lighting element is mounted may be determined based on the direction of the associated pointing vector.

These, and other aspects, of the present disclosure will become apparent to one of skill in the art when reading the present disclosure, particularly with reference to the accompanying drawings.

DETAILED DESCRIPTION

The present disclosure recognizes that it is desirable in LED-based lighting design to create a low-cost LED lamp containing an array of LEDs. The present disclosure also recognizes that it is desirable to create a uniform illumination pattern or, in cases, where a specific non-uniform illumination pattern is desired, it is desirable to provide illumination in the desired pattern. Furthermore, the present disclosure recognizes that in order to further reduce cost, the number of LEDs requiring collimation should also be minimized. The present disclosure provides light units that meet these criteria, as well as a methodology to produce such an enhanced design. The application in which the lamp is to be used, such as roadway illumination, office or other workplace lighting, or residential lighting, has a basic output pattern requirement. Such an output pattern requirement may include minimum illumination in foot candles, and an area range of illumination depending on the height of the lamp and the spacing between the lamps. First, when the required pattern width is sufficient to allow it, a sufficient number of uncollimated LEDs are used to establish a central illumination peak. After this, narrow LED beams are pointed to "fill in" the output pattern to create a uniform output pattern that meets the output pattern requirement. Thus, the present disclosure provides a lamp with a desired output pattern while reducing lamp cost through reduced numbers of light elements and reduced optics required to a lamp.

Figure 1:
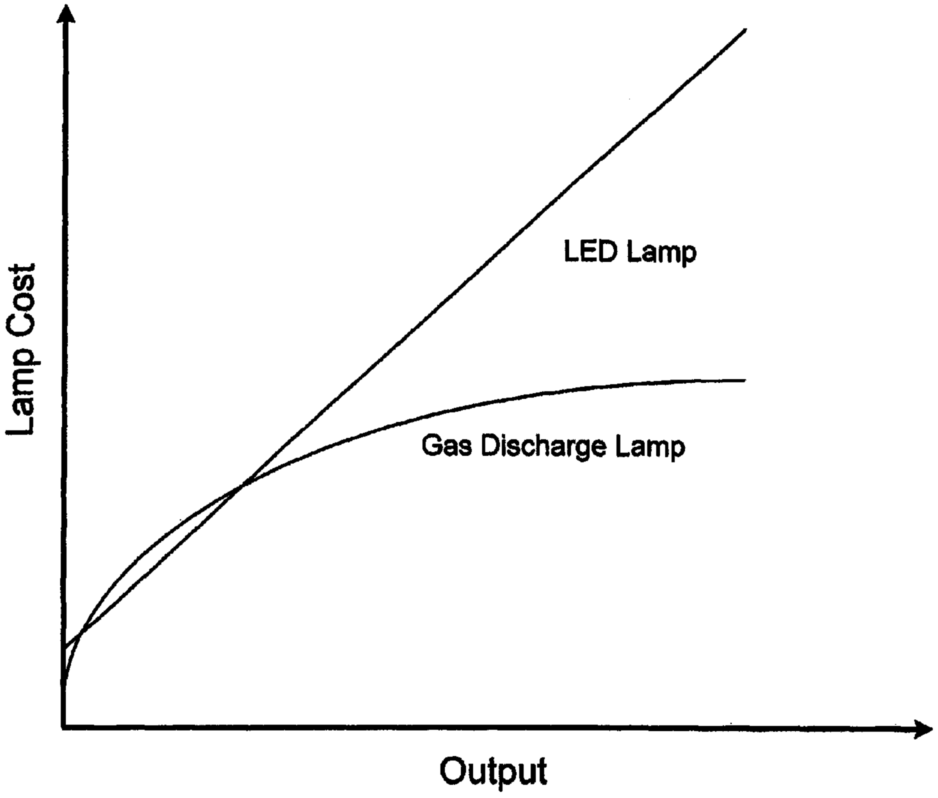
FIG. 1 is a chart illustrating the cost of a lamp versus the output of the lamp for an LED lamp and a Gas Discharge Lamp.

With reference first to FIG. 1, a graph illustrating relative costs for different types of lamps is discussed. As can be observed from FIG. 1, the cost per lumen output of a typical gas discharge lamp falls with increasing lumen output. In order to increase the lumen output of an LED lamp, however, requires adding more LED elements such that the cost of the LED lamp is linear with output. Stated differently, the cost per lumen output of an LED lamp is essentially constant for increasing output. According to present day designs, this creates a scenario where there are at least three regimes where a LED based luminare can be cost competitive with a gas discharge lamp. The first is at lower lumen output levels, as is commonly observed in low power specialty lighting market such as for automotive lighting and flashlights, where LED based lighting has gained significant market share. The second is where the cost of the decorative fixture is a high percentage of the total luminare cost, such as in architectural lighting. The third is where the cost of relamping (often referred to as life cycle costs or total cost of ownership) is high, such as in high, difficult to access lighting applications.

As technology continues to advance, LED outputs are increasing while costs are falling, which has the effect of lowering the slope of the LED lamp curve illustrated in FIG. 1, making the higher power applications much more attractive. Because LED lamps for general lighting applications generally require an array of LED lamps (multiple lamps placed at locations to provide adequate illumination for the entire area to be lighted), there exists a quasi-trade between the efficacy of the LED lamp and the number of lamps required for an application. This trade works to balance the anticipated life cycle savings with the incurred initial cost penalty.

Figure 2:
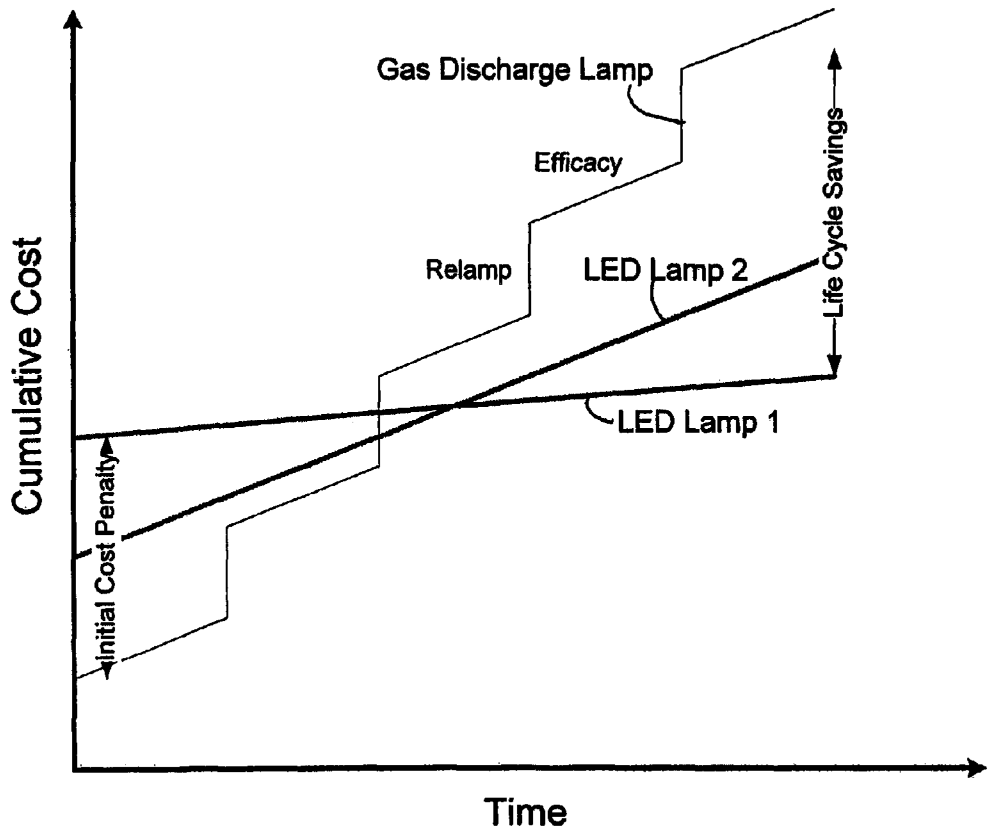
FIG. 2 is a chart illustrating the cost of a lamp versus the output of the lamp, including total life-cycle costs, for an LED lamp and a Gas Discharge Lamp.

With reference now to FIG. 2, a graph illustrating relative life cycle costs for different types of lamps is discussed. The graph of FIG. 2 illustrates two LED lamp cost curves, and one gas discharge lamp cost curve. The curve labeled LED Lamp 1 illustrates life cycle costs for an LED lamp that has an increased number of LED elements that operate using a lower operating current. The curve labeled LED Lamp 2 illustrates life cycle costs for an LED lamp that has a reduced number of LED elements that operate using a higher operating current, relative to LED Lamp 1. The curve labeled Gas Discharge Lamp illustrates life cycle costs for a gas discharge lamp, illustrating several discontinuities in the curve that correspond to re-lamping costs. Of the two LED lamp scenarios illustrated in FIG. 2, LED Lamp 1 has a higher efficacy yet at a higher initial cost. LED Lamp 1 has a higher life cycle savings than LED Lamp 2 yet at the penalty of a higher initial cost. The preferred lamp for a particular application will depend on various economic factors. From a total cost of ownership perspective, LED Lamp 1 would be preferable due to overall lower costs. However, secondary factors such as the time value of money (discounts future savings) and the psychology of cost versus time might create the situation where LED Lamp 2, or even a gas discharge lamp, is more attractive. An ideal scenario would provide an LED lamp with a reduced number of LED elements that operate using relatively low operating currents, thereby reducing operating costs and extending the lifetime of the lamp.

As discussed above, from a light output perspective, a single LED is a relatively low light level device, typically about 100 lumens. In order to create the output of a normal incandescent or compact fluorescent light bulb, between 10 and 20 LED emitters are required using present day technology. This leads to lamps with relatively high initial installation costs relative to traditional lighting counter parts. The present disclosure provides LED based lighting products that are cost competitive with current products by providing LED lamps that minimize the number of LED's utilized in the design. The number of LED elements used in a lamp is referred to as LED headcount.

LED headcount is affected by a number of factors. One, lumen maintenance, refers to the manner in which LED's age and loose power over time. A traditional approach is to design the lamp such that the over production of light at the beginning of life of the lamp is the same as the reduction of light output at the designated end of lifetime. For example, since a typical LED's lifetime is defined when its power drops by 30% relative to its initial value, an LED based lighting product will contain a 30% higher LED headcount to account for this lumen maintenance. Another factor in LED headcount is the number of LED elements required to produce the desired beam pattern that is emitted from the lamp. Still another factor in LED headcount is the total output required from the lamp, with a lamp that requires a higher lumen output requiring a higher LED headcount.

Because LED Based lighting devices use a multiplicity of single LED emitters, the resulting illumination pattern is the incoherent sum of the patterns of the individual LEDs. For example, often illumination patterns are created using a pattern that is the sum of the pattern of the multiplicity of LEDs that all point in the same direction. In this case the output pattern of the ensemble of LEDs closely follows the pattern of each individual LED. Other designs may use groups of LED elements that have associated optics to provide a beam shape that, when combined with the output of other LED elements, provides a lamp output that meets specified criteria. Thus, the overlapping beams from the discrete LED elements are used to create crude approximations of the required illumination patterns. Generally, such designs provide a central peak of the illumination pattern that is higher than necessary in order to lift the light intensity at the outer edges of the illumination pattern to the minimum required intensity. However, this creates a design that is significantly less than optimum with respect to LED headcount. The present disclosure provides substantial gains through a closer tailoring of the illumination pattern to the actual requirements of the luminare.

Figure 3:
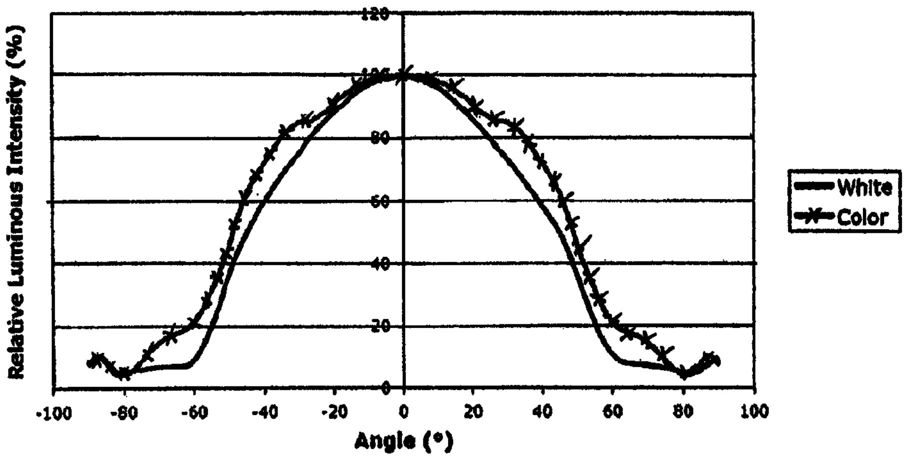
FIG. 3 is a chart illustrating the relative luminous intensity of an LED versus angle from the defined propagation for the peak intensity of the LED.

With reference now to FIG. 3, a graph of the basic outputs of an uncollimated white LED and an uncollimated color LED are illustrated. As can be observed, the relative luminous intensity is essentially of the form Cos(theta) where theta is the angle from the defined propagation for the peak intensity of the LED. This type of radiation pattern is often referred to as a Lambertian pattern. A key consideration in working with LED beams is defining the width of the beam. For IESNA/ANSI/NEMA definitions for Type B distributions the "Beam Angle" is defined as 50% of max. and the "Field Angle" as 10% of max. These angles refer typically to a half angle. In the graph of FIG. 3, the beam angle of the uncollimated LED would be approximately 50 degrees, and the field angle would be approximately 20 degrees. The light intensity on a flat surface a distance away from the source is arrived at by propagating the above angular distribution to the projection on the desired surface.

Figure 4:
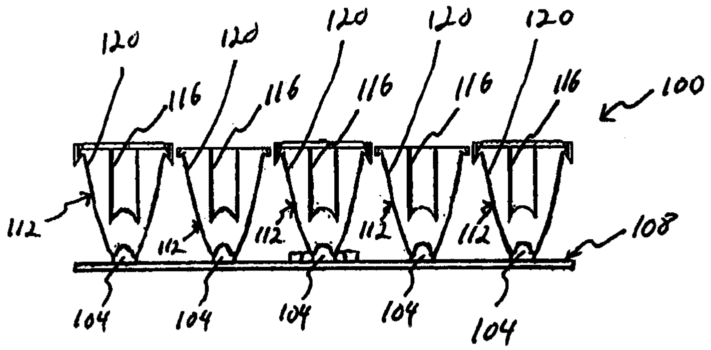
FIG. 4 is a cross-sectional illustration of an array of LED elements of an embodiment of the disclosure.

With reference now to FIG. 4, a cross-sectional illustration of an array of five LEDs, and associated collimating optics, is illustrated for an embodiment. The array 100, in this embodiment, includes five individual LEDs 104 that are mounted on substrate 108. The substrate 108 includes interconnects that connect each LED 104 to an associated power source (not illustrated). The substrate 108 may also include a heat transfer mechanism, such as a heat sink, that acts to dissipate heat that is generated by the LEDs 104. Collimating optics 112 are mounted on the substrate 108 and over each associated LED 104 to provide an output light pattern from each LED 104 that is collimated relative to a beam that would be produced without the collimating optics 112. The cross section of FIG. 4 illustrates a hybrid type design, where the central rays from each LED 104 experience collimation via a refraction component 116 and the outer rays experience collimation via a reflection component 120. Such optical components are known in the art, and a refraction component may include optical lenses that act to refract light in a desired pattern, and a reflection component may include a reflective material deposited to create a mirrored surface to reflect light in a desired pattern. In one embodiment, the collimation of an LED 104 produces a beam angle in the 5% range In another embodiment, an LED 104 produces a beam angle of about 2%. In the illustration of FIG. 4, it should also be noted that the five optics are all pointing in the same direction, and will have a distant profile whose intensity profile is the same as that of the individual beams. As described with respect to FIG. 3, an LED without any secondary optics will generally radiate the Cos(theta) or Lambertian pattern. Adding an optic with positive power of the appropriate focal length and numerical aperture will act to collimate the radiation pattern to create a beam with a divergence pattern that is narrower than the pattern generated by the LED without any optics.

In order to understand the effect of collimation upon the far field intensity, it is first noted that the uncollimated LED with a Lambertian radiation pattern has the intensity profile:

$$Io=PT/2[\cos(\theta)]$$

Where PT is the Total emitted power. A collimated LED with have the profile:

$$Io=nPT/2[\cos(n\theta)]$$

A standard Lambertian Pattern has full-width half-maximum (FWHM) angle of 120°, and a 5° FWHM collimated pattern will have an n=24. Thus, in the embodiment of FIG. 4, each of the LEDs in the array provides an intensity as defined in the equation for the collimated LED.

Figure 5:
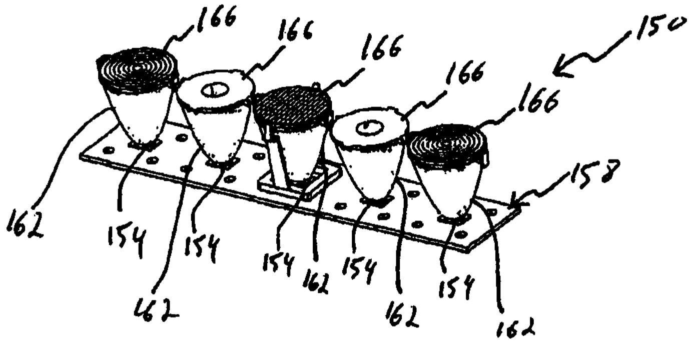
FIG. 5 is a perspective illustration of an array of LED elements of an embodiment of the disclosure.

With reference now to FIG. 5, a perspective illustration of the array 150 of LED elements is discussed for an embodiment. In this embodiment, an array of five LEDs 154 are mounted on a substrate 158. Similarly as described above with respect to FIG. 4, the substrate 158 includes interconnects that connect each LED 154 to an associated power source (not illustrated). The substrate 158 may also include a heat transfer mechanism, such as a heat sink, that acts to dissipate heat that is generated by the LEDs 154. Collimating optics 162 are mounted on the substrate 158 and over each associated LED 154 to provide an output light pattern from each LED 154 that is collimated relative to a beam that would be produced without the collimating optics 162. In this embodiment, in order to provide additional shaping of the LED 154 output, frensel type lenses 166 are attached to the collimating optics 162 to further shape the collimated light output. These snap-on lenses 166 types can create wider and oval type patterns. Thus, the output of the array of LEDs 150 may be selected to provide an aggregate, or synthesized, pattern that has desired characteristics.

Figure 6:
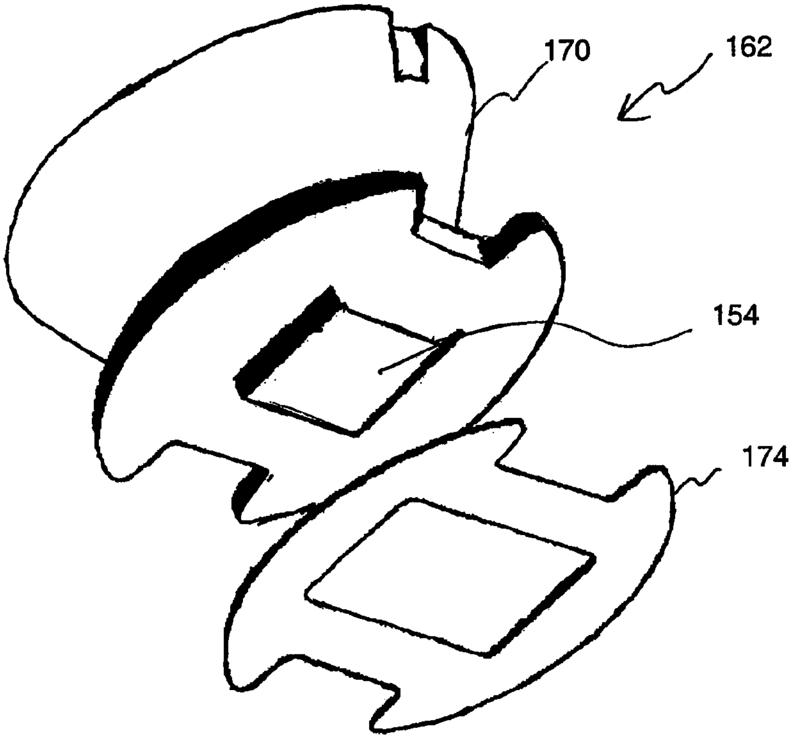
FIG. 6 is an exploded view of a collimating optic element of an embodiment of the disclosure.

FIG. 6 is an illustration of a collimating optic component 162. The collimating optic 162 includes lens portion 170 that is adapted to receive an LED light element 154. The lens 170 is mounted to a substrate using an adhesive pad 174, in this embodiment. As described above, frensel type lenses may be attached to the lens 170 to further shape the light output. As will be described in additional detail below, a low cost lamp with a uniform output, which reduces the number of LED's required for a given illumination, can be achieved by using an appropriate combination of uncollimated, narrowly collimated, wide angle and/or oval projection LED beam patterns.

As discussed above with respect to FIG. 3, nearly all LED emitters have a central lobe where the intensity of the emitted light is peak, and the intensity drops off as a function of angle away from the centerline. This is also the case for collimated and shaped individual LED emitters. This central lobe can be thought of as a vector whose direction coordinates in XYZ space describe the propagation direction of the central lobe, and the magnitude of the vector is the peak intensity of the light. In the case of the uncollimated LED, the central lobe vector would be at Zero degrees and have a magnitude equal to Pt/2. A collimated LED would have a similar direction and a magnitude of nPt/2 where n is the degree of collimation, as described above.

Figure 7:
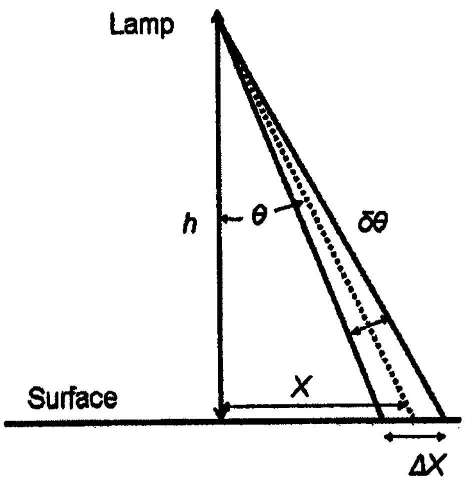
FIG. 7 is a diagrammatic illustration of angular intensity of the output of a lighting element.

When creating a lamp having a uniform illumination pattern, angular intensity of a light element must also be considered. With reference to FIG. 7, a lamp at height h illuminates a surface. For a given angle (θ), the illuminated surface for that angle will grow the farther one gets from the normal to the illuminated surface. For uniform illumination, the angular intensity must follow the relationship:

$$h[\tan(\theta+\delta/2)-\tan(\theta-\delta/2)]$$

In typical lighting environments, the spacing of lamps is defined in terms of the lamp height; i.e. if the spacing between lamps is nh, then the maximum angle to be considered is where tan(θmax)=n/2. The creation of a uniform illumination pattern will correspond to a situation where the LED light propagated into an angle delta theta must increase by the relationship shown above in order to provide the desired intensity of light.

In one embodiment, LED elements are selected for placement in a lamp assembly so as to provide a desired output pattern. The lamp assembly itself, in this embodiment, includes LEDs that are mounted on different surfaces to provide light output from the LEDs in different directions. By selecting the light directions, in conjunction with the uncollimated optics, narrowly collimated, wide angle and oval projection LED beam patterns, a synthesized lamp output may be developed that provides a uniform lighting pattern with a minimum number of LED elements. Such a lamp will provide lighting on a surface at or above desired lighting levels, and have a cost that is reduced based on the presence of few, if any, additional LED elements beyond the minimum number required to provide the specified lighting levels throughout the desired lighting area.

Figure 8:
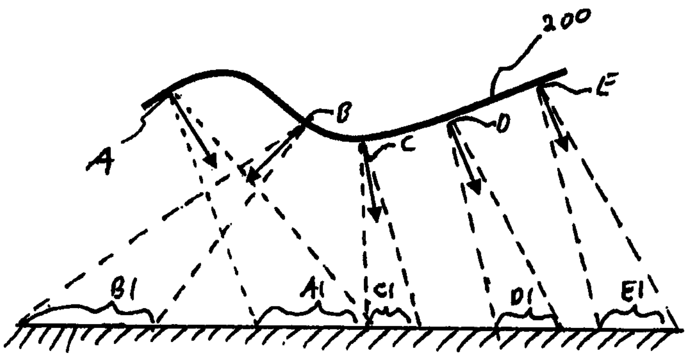
FIG. 8 is a diagrammatic illustration of a two-dimensional surface of an embodiment having point light sources thereon that provide light output in the direction normal to the surface.
Figure 9:
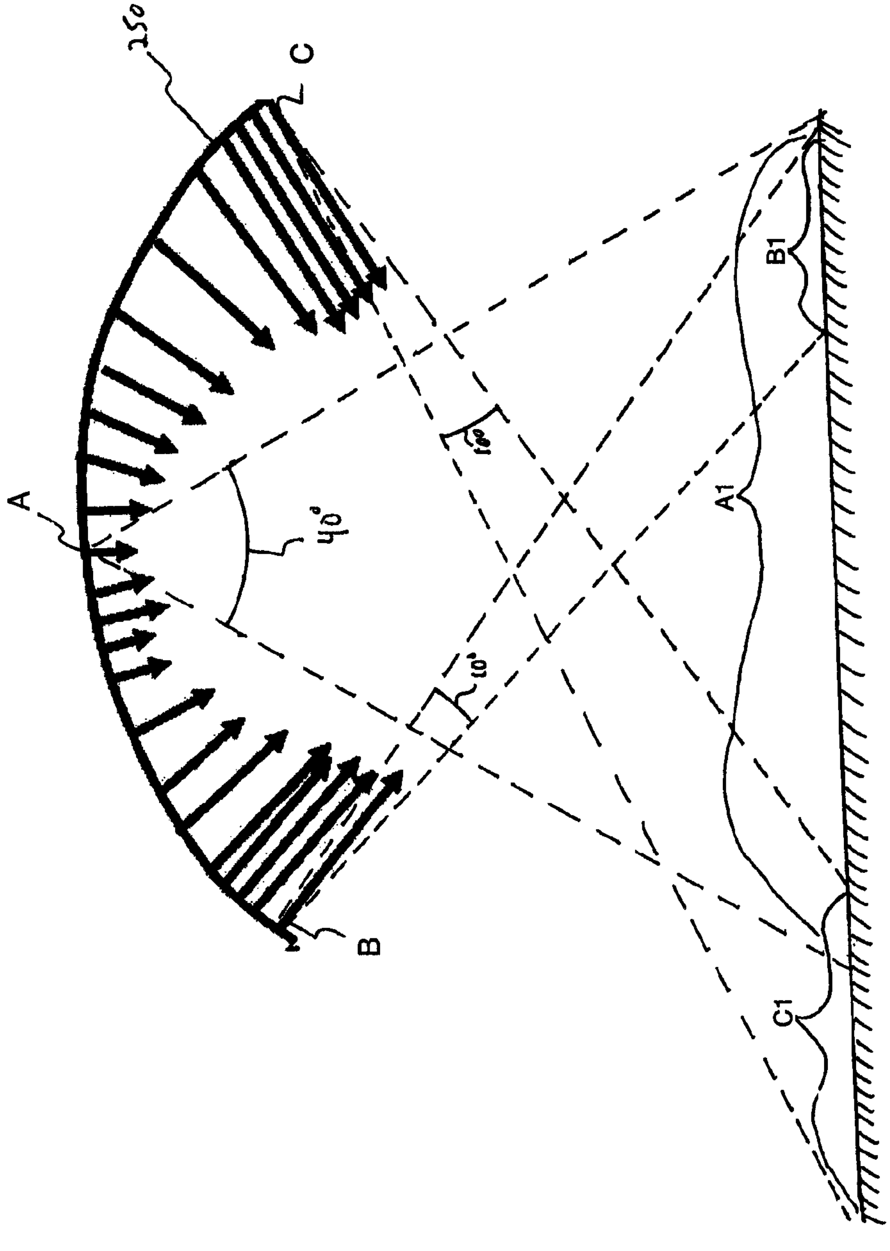
FIG. 9 is a diagrammatic illustration of a two-dimensional surface of another embodiment having point light sources thereon that provide light output with varying light intensities and different collimation.

Such a LED lamp assembly is achieved, in one embodiment, by designing the placement of LED elements to create the desired output light pattern. For LED illumination, light intensities from individual LED elements add linearly through incoherent additions. When designing LED layout, it is assumed that when the half-intensity points of each beam match, the intensity between the two beams is nearly equal. In such an embodiment, as mentioned above, the output central lobe can be thought of as a vector whose direction coordinates in XYZ space describe the propagation direction of the central lobe, and the magnitude of the vector would correspond to the peak intensity of the light. In one embodiment, an illumination pattern can be synthesized by creating a surface such that the LED central lobe vectors are normal to this surface. For example, FIGS. 8 and 9 illustrate 2-dimensional surfaces having LED elements thereon that illuminate different areas on an illuminated area. In the example of FIG. 8, a surface 200 includes five LED elements, A through E. In this example, each LED element, A-E, includes collimating optics that collimate the beam output from each LED to provide a 5° beam angle. The portions of the illuminated area are illustrated as areas A1 through E1, respectively, as illuminated by the corresponding LED element A through E. FIG. 9 illustrates an embodiment where different optics are implemented on different LEDs on a surface 250. In this embodiment, a first LED, illustrated as “A” is an uncollimated LED with a beam angle of 20°, thus providing illumination to the portion A1 of the illuminated area. A second LED, illustrated as “B” includes collimating optics to provide an LED with a beam angle of 5°, thus providing illumination to the portion B1 of the illuminated area. Similarly, a third LED, illustrated as “C” includes collimating optics to provide an LED with a beam angle of 5°, thus providing illumination to the portion C1 of the illuminated area. The remaining LEDs mounted to the surface 250 may be uncollimated, or include collimating optics and/or spreading lenses, in order to provide a desired intensity of light to the illuminated area with a consistent uniformity throughout the illuminated area.

In such a manner, a LED based lamp may be produced that provides desired optical illumination patterns. Modeling lamp output as a combination of vectors can allow various techniques, such as creating a density and intensity of pointing vectors in order to create the desired intensity pattern; selecting the density of converging vectors to create desired intensity; and selecting the density of parallel vectors to provide tiling of LED output. Of course, combinations of vectors may be used to create intensity variations of both density and tiling. Furthermore, variations in shaping types in the LED array may be modeled as well. The ideal pattern results in the optimal combination of vectors based on: variation in direction of vectors; variation of density of vectors; and variation in length (Intensity) of vectors.

Figure 10:
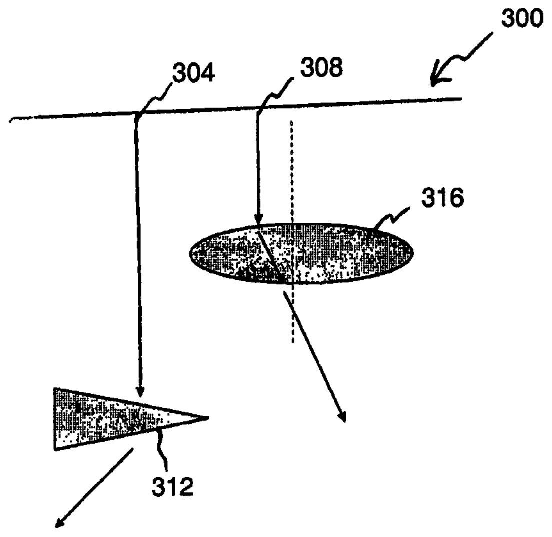
FIG. 10 is an illustration of beam steering optics of another embodiment of the disclosure.

With reference now to FIG. 10, another embodiment is described. Rather than arrange LEDs on a lamp surface that has multiple vector directions, beam steering optics in combination with LED elements are used to generate a desired illumination pattern. In the example of FIG. 10, a surface 300 includes two LED elements 304, 308. Each LED element has an associated beam steering optic, 312, 316, respectively. Thus, the beam generated from LED 304 is directed through beam steering optic 312 in a desired direction. Similarly, the beam generated from LED 308 is directed through beam steering optic 316 in a desired direction. A number of LED elements may be included on a surface, with different LEDs, or groups of LEDs, associated with a specific beam steering optic, to generate a synthesized illumination pattern that meets the needs of a particular application. Furthermore, in other embodiments, both a lamp surface with multiple vector directions, and beam steering optics, may be used in conjunction to generate a desired illumination pattern.

In one embodiment, a pattern synthesis is used to determine a configuration for a luminaire based on the desired output pattern from the luminaire. This method is described schematically in FIG. 11. In this embodiment, it is desired to enhance the visibility of objects in the roadway. Since the purpose of roadway lighting is not only to see the road but also see any objects that that might be in the road. As is understood in the art of roadway lighting, bidirectional luminaires normally used on streets with no median and two way traffic create small target visibility (STV) by both positive and negative contrast. Reversal of contrast normally occurs twice in the spacing cycle, on a line beneath the luminaire and again about one third of the distance between luminaires. With staggered arrangements the number of contrast reversals may increase. It is desirable to reduce the number of times there is a reversal between positive and negative contrast and to reduce the reversal area. In an area of positive contrast, the target face should be made as bright as possible and the roadway surface against which it is seen should be reasonably dark. In an area of negative contrast the reverse should be true. It is desirable therefore to achieve the desired average pavement luminance with luminance uniformity varying from close to the maximum permitted to the minimum permitted. The choice of the correct luminaire distribution and spacing is very critical to the achievement of high values of STV.

Referring again to FIG. 11, Lamps 320 having a mounting height of height h, and separation d, are shown in relationship with respect to the direction of travel on a roadway 324. The major extent of the illumination pattern before the light is illustrated as x, and the major extent of the illumination pattern after the light is illustrated as y, and the overlap between the lights is shown as z. The angle from the light to the ground away from the post is defined as theta, with the light pole as theta=0. A desired illumination pattern will have major extent of the illumination pattern before the light such that the distance x corresponds to an angle less than the angle that is visible by an oncoming motorist. This will reduce glare experienced by a motorist traveling in the direction of travel on the roadway surface 320. The major extent after the light y is limited by issues such as excessive trespass and creating glare for motorists in the opposing lane. Furthermore, target visibility is enhanced by minimizing the area of overlap z between the lights. By careful control of the fall off area of the light this can be achieved. A uniform illumination pattern will have an angular intensity described essentially as a tangent function. In one embodiment, relatively narrow beams are employed to provide this termination, a transition from the tan(theta) angular intensity line to a transition that goes to zero as quickly as possible. This transition line should follow the beam pattern of the outermost beam components of the light. The use of highly collimated beams as defined by the pattern synthesis process can be employed to create the pattern termination properties required for minimizing the veiling luminance, glare, and increasing target visibility. A top plan view of an exemplary roadway 324 with lamps 320 and the areas x, y, and z, is illustrated in FIG. 12.

Figure 11:
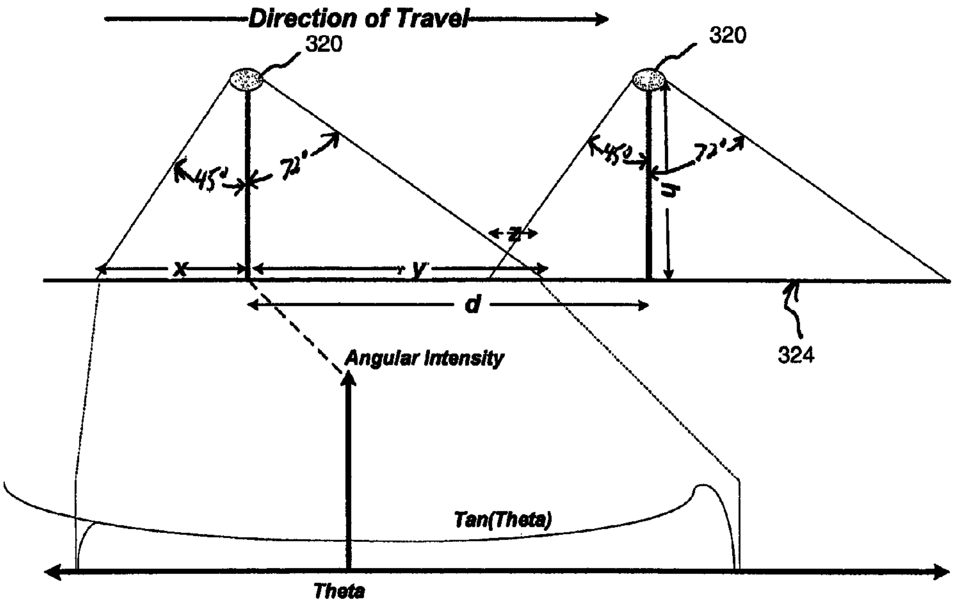
FIG. 11 is an illustration of a roadway illuminated using luminaries with an asymmetric output pattern of an embodiment.
Figure 12:
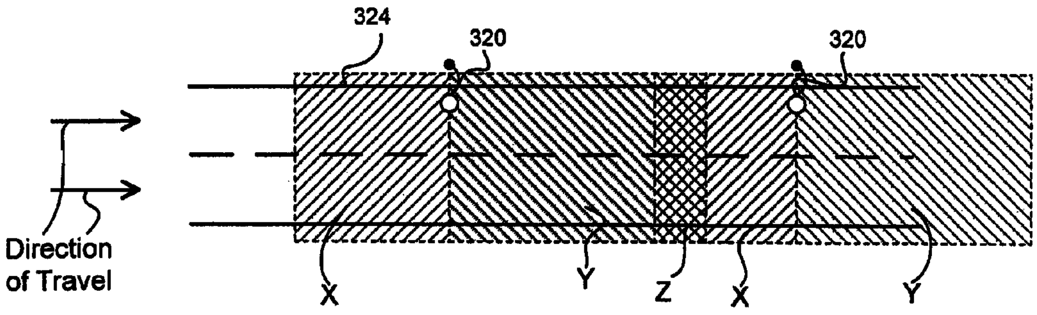
FIG. 12, is an illustration of output areas on a roadway surface of an embodiment.

The illustration of FIG. 12 is well suited for use in applications where one or more lanes of a roadway 324 have a single direction of travel. Such applications may include divided highways, and one-way thoroughfares. It has been found that the optimum angle for directing light down a roadway (along the direction of travel) is between sixty and seventy-six degrees, and more preferably between about seventy-two degrees and seventy-six degrees. It has been found that the optimum angle for upstream light (into the direction of travel) is between zero and about fifty degrees. Light emitted at a higher angle against the flow of traffic is more likely to shine directly in the eyes of drivers and create a safety hazard. In the embodiment of FIG. 11, LED modules are configured within each lamp to provide light output at approximately 72 degrees in the direction along the direction of travel, and about 45 degrees in the direction into the direction of travel.

Figure 13:
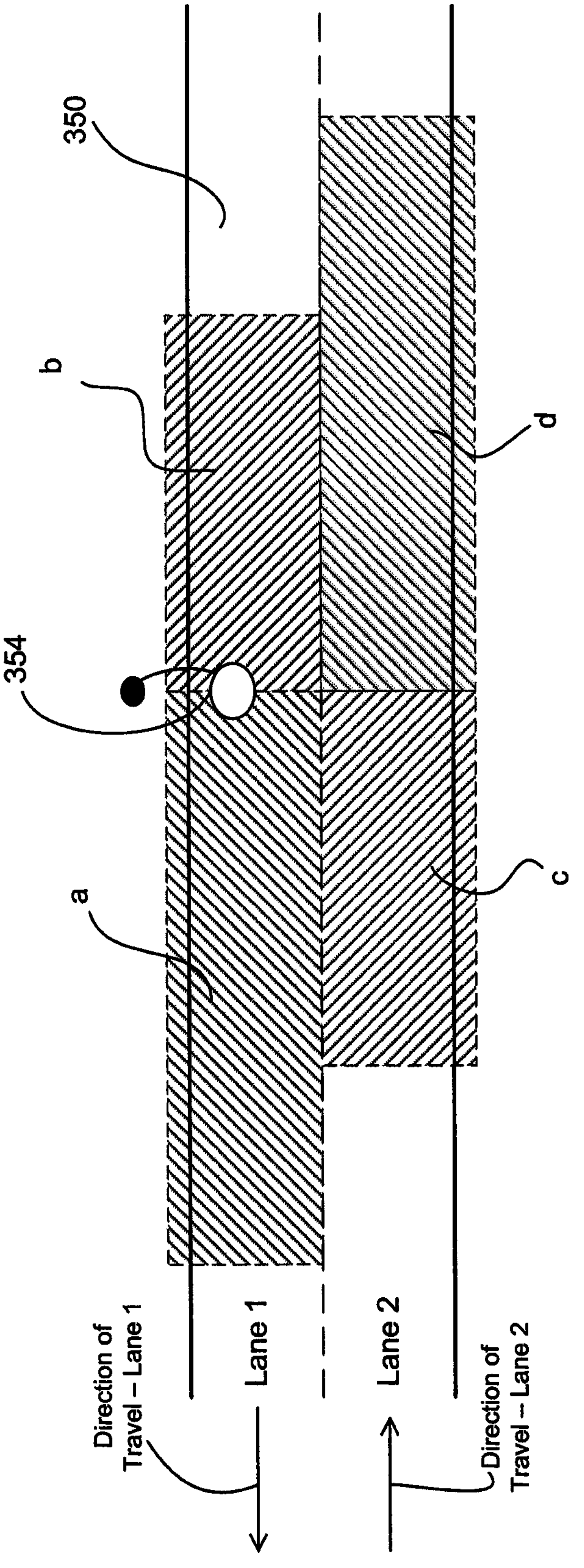
FIG. 13, is an illustration of offset output areas on a roadway surface of another embodiment.

In applications where two (or more) lanes of traffic having opposed directions of travel are present on a roadway, lamps such as illustrated as lamps 320 in FIG. 12 are less well suited, as traffic in one direction will have more glare and thus reduced visibility of small targets. In another embodiment, illustrated in FIG. 13, each luminaire outputs a light pattern in which the illuminated area on a roadway surface 350 is shifted based on the direction of travel for particular lanes in the roadway 350. In this embodiment, a luminaire 354 outputs light along about a 72 degree angle along the direction of travel for a first lane in the roadway 350, this illuminated area identified as area ‘a’ in FIG. 13. The luminaire 354 outputs light along about a 45 degree angle against the direction of travel for the first lane, this illuminated area identified as area ‘b’ in FIG. 13. Similarly, the luminaire 354 outputs light along about a 45 degree angle against the direction of travel for the second lane and along about a 72 degree angle against the direction of travel for the second lane, these areas identified as areas ‘c’ and ‘d’ respectively, in FIG. 13.

A design procedure to utilize pattern synthesis to design lighting fixtures that achieve these desired output patterns includes several elements. In one embodiment, photometric files that provide a model of light output for the LED package are provided. Such files may be provided by the LED manufacturer, or generated by an optical laboratory. The LED photometric files are used to make a lamp model. Next, a photometric file is generated for the LED in combination with any secondary optics. If the necessary secondary optics are not available, they can be designed using modeling surfacing or solid modeling software such as Rhino and Solidworks. A lighting application software that predicts illuminance on horizontal and/or vertical surfaces from luminaire systems, such as AGI32, is then used to aim the individual LED’s or LED modules. Once the LED’s have been positioned and aimed, the lighting application software calculates the system performance. Several iterations of this step may be necessary to fine tune the aiming. At this point, a surfacing software may be used to make what is called a disk or module. A disk or module, as referred to herein, is a conglomeration of LED’s combined into and modeled as a single light source. The surfacing software is then used to aim the disks per the diagram generated by the lighting application software. Solid modeling software, such as Solidworks, is then used to model a luminaire, that is the housing, lens, and other components. The photometric performance of the new luminaire is then simulated. The luminaire model may then be used in lighting application software, such as AGI32, to calculate the luminaire performance in various lighting applications.

Figure 14:
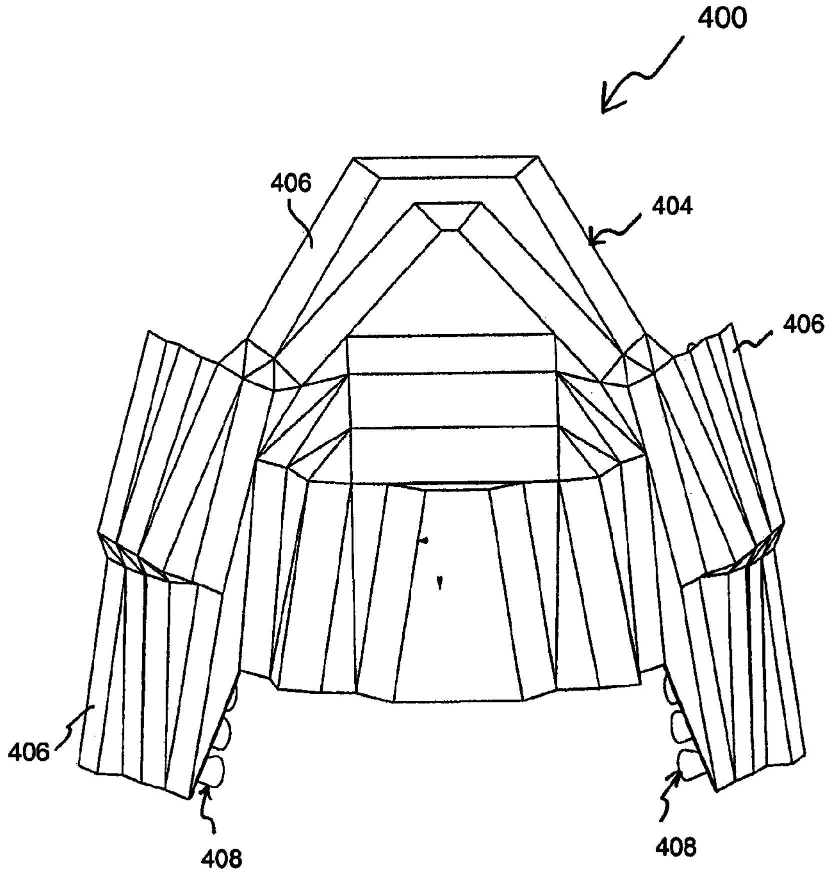
FIG. 14 is a top plan view of a lamp assembly of an embodiment of the disclosure.
Figure 15:
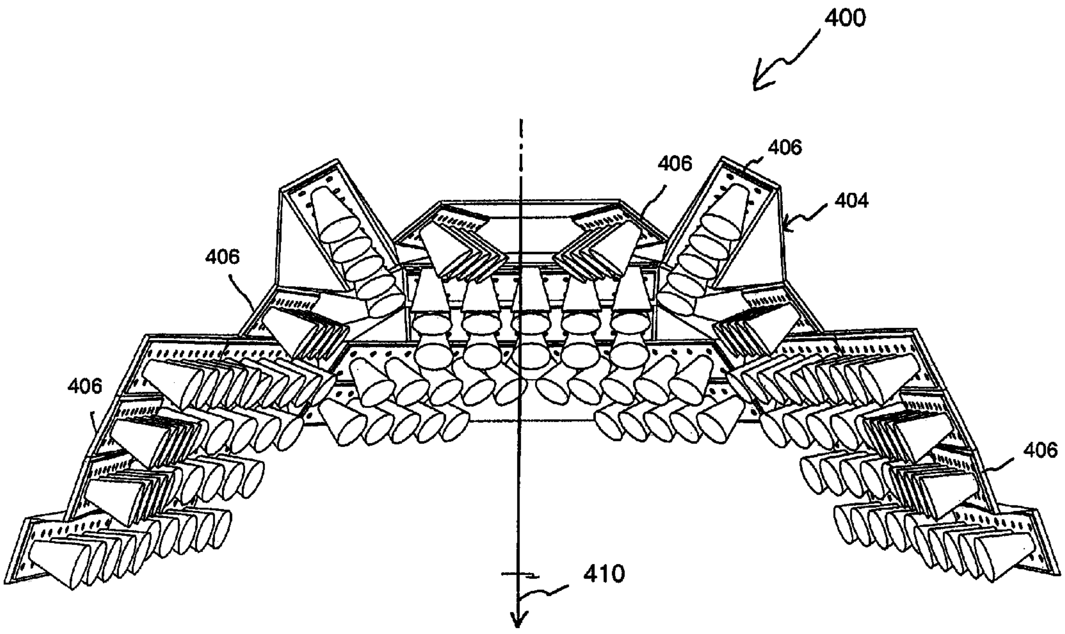
FIG. 15 is a side elevation view of the lamp assembly of FIG. 14.
Figure 16:
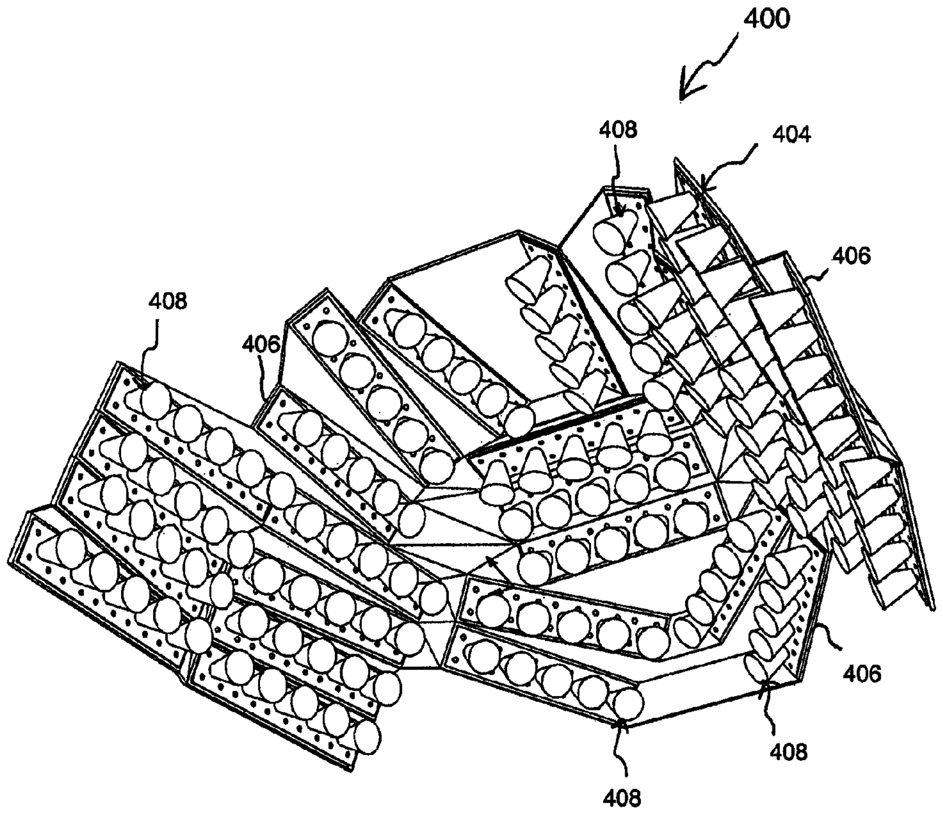
FIG. 16 is a is a perspective view of the lamp assembly of FIG. 14.
Figure 17:
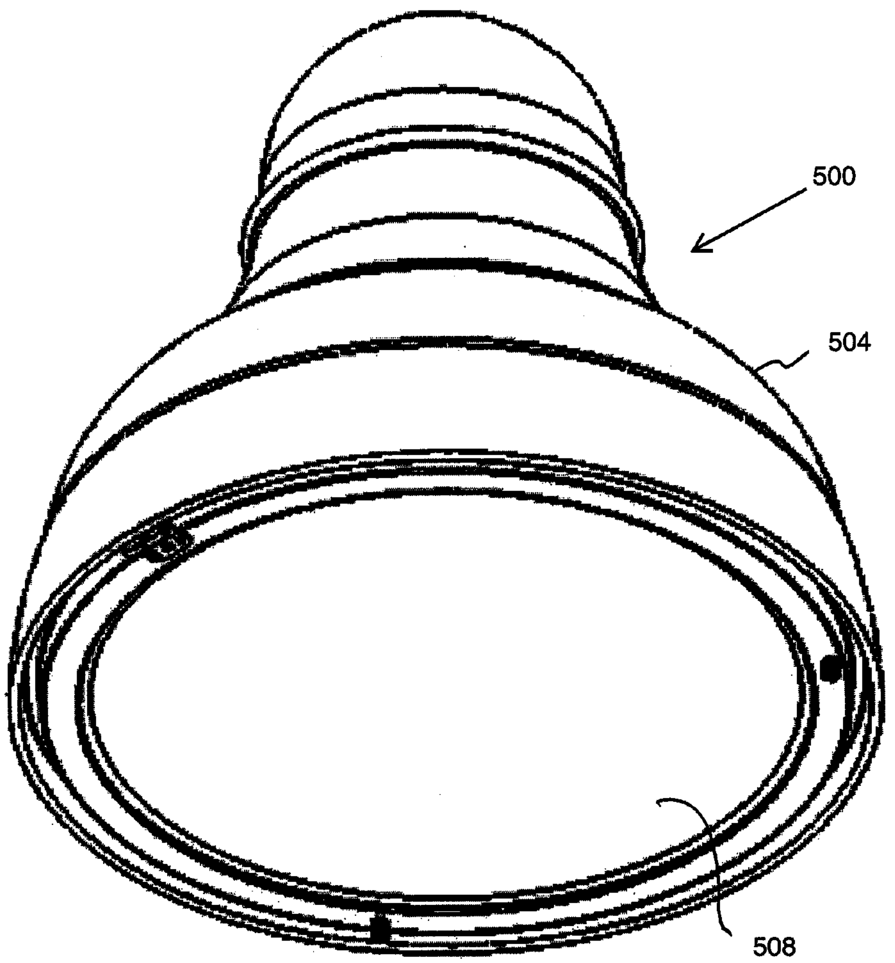
FIG. 17 is a bottom perspective view of a lamp assembly of another embodiment of the disclosure.
Figure 18:
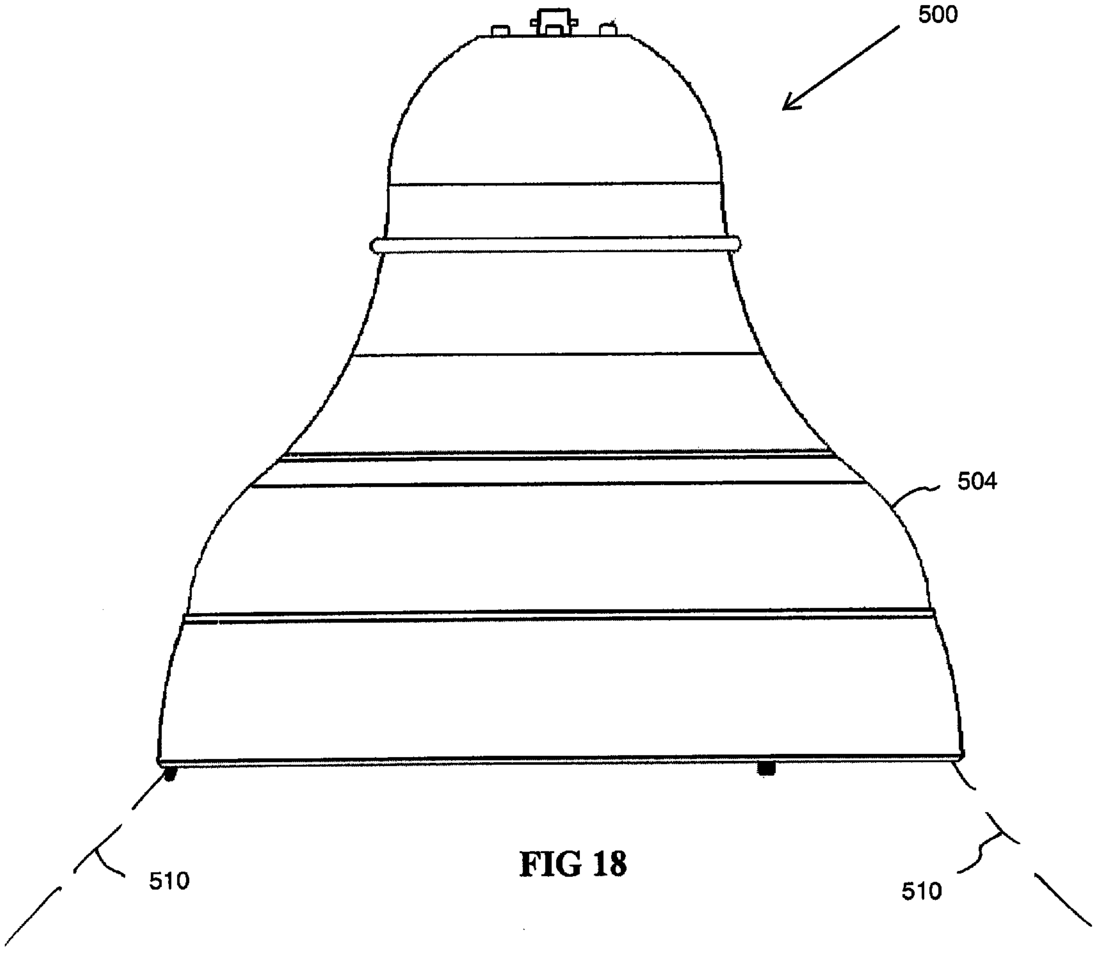
FIG. 18 is a side elevation view of the lamp assembly of FIG. 17.
Figure 19:
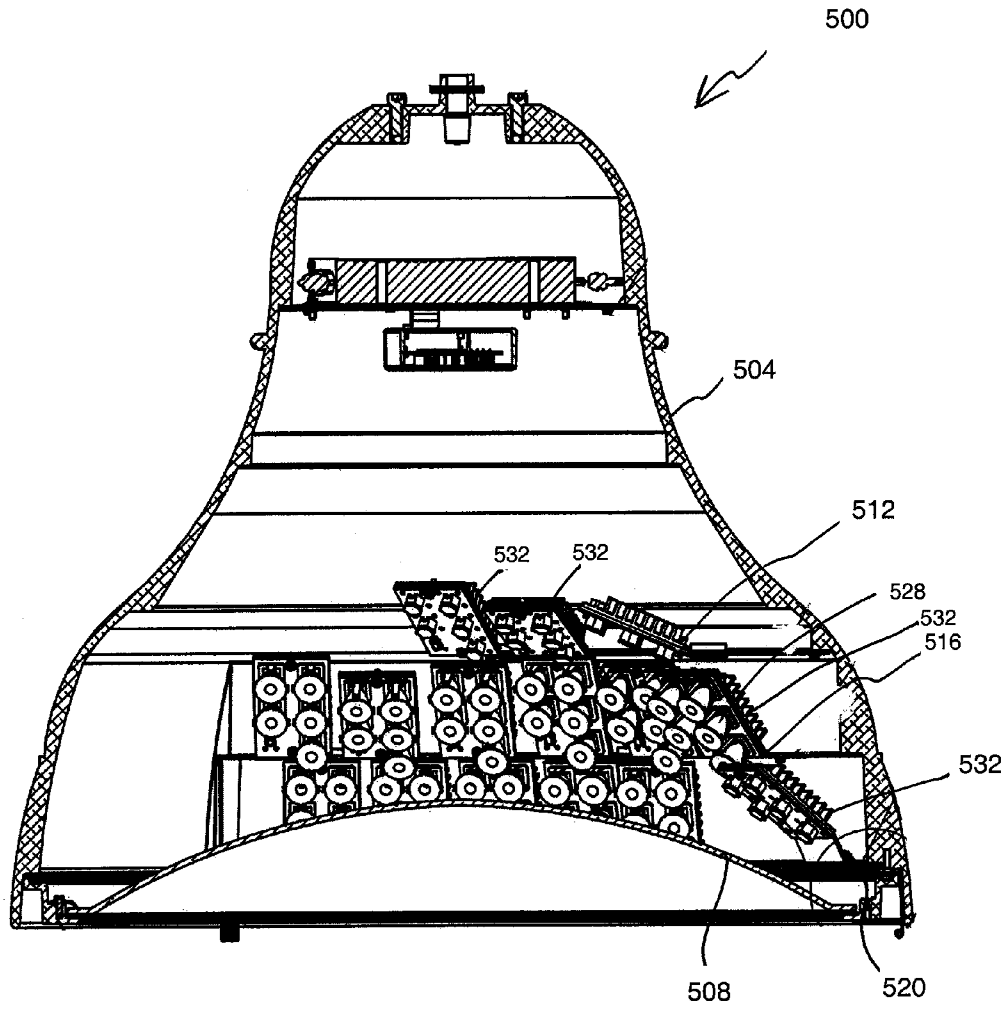
FIG. 19 is a cross-sectional illustration of the of the lamp assembly of FIG. 17.
Figure 20:
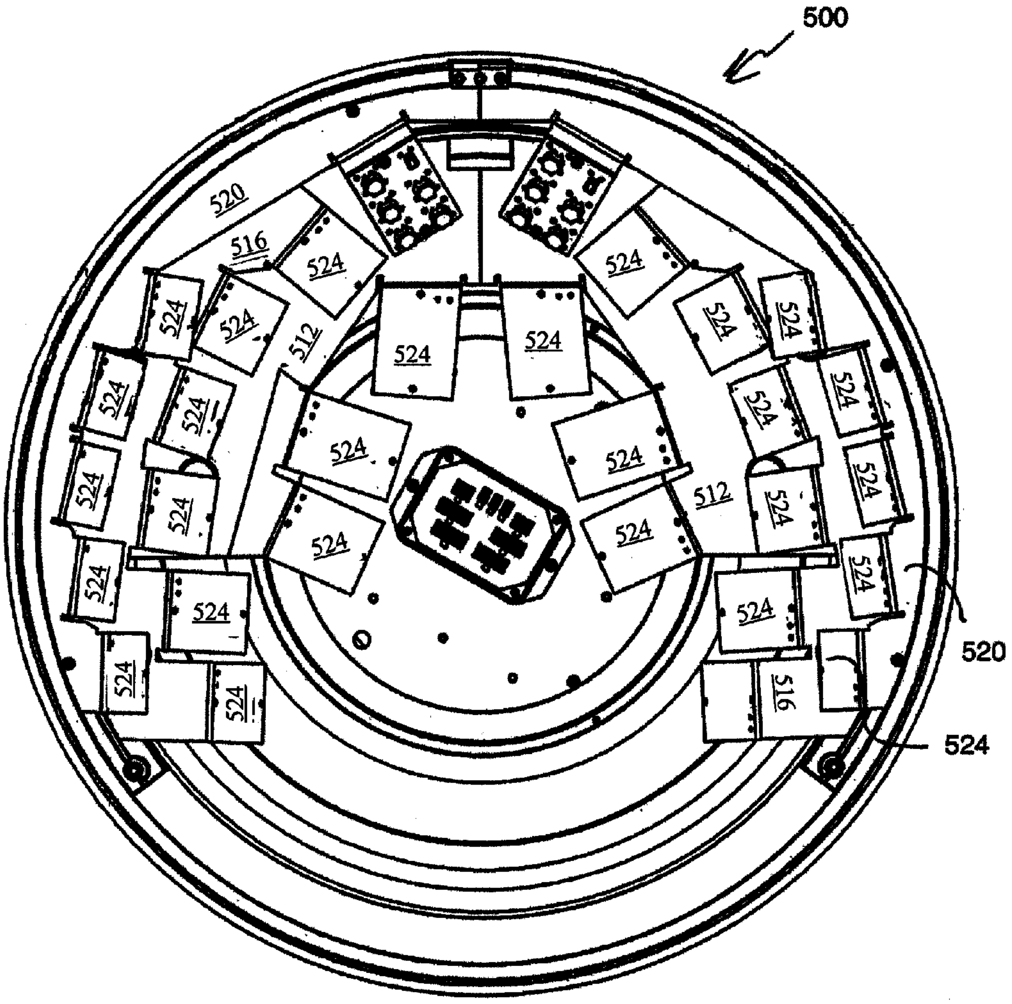
FIG. 20 is a bottom plan view of a partially assembled lamp assembly of FIG. 17.

With reference now to FIGS. 14 through 16, a LED based lamp assembly of an embodiment is described. In this embodiment, the lamp assembly 400 includes a surface 404 that has a number of different angled mounting surfaces 406 onto which LED assemblies 408 are mounted. The lamp assembly 400 provides light output in the direction of primary axis 410. LED assemblies 408, in this embodiment, are similar to the LED arrays 100 and 150 as described previously with respect to FIGS. 4 and 5. The LED assemblies 408, in this embodiment, include an array of five LED elements, and may include collimating or other beam shaping optics associated with the LEDs. The lamp assembly 400, of this embodiment, is designed to provide a replacement for traditional 150 Watt metal halide type architectural street lights. The LED assemblies 408 include one type of standard LED, and in one embodiment the LED is a white LED that operates at a current of approximately 500 to 600 mA and provides an output flux of approximately 170 to 250 lumens.

The LED assemblies 408, in an embodiment, include three types of collimation, namely a 5 degree narrow beam, a 20 degree beam (uncollimated), and a 20 degree by 5 degree oval beam. The LED assemblies of this embodiment, as mentioned above, include five LEDs, and provide tiling of the LED outputs. Such assemblies provide simplified manufacturing by allowing a five-element array to be mounted to the surface 404. However, it will be readily recognized that individual LEDs may be mounted on a surface, or arrays of LEDs having differing numbers of LEDs on the array may be employed. In another embodiment, the LED assemblies 408, each include a collimator that collimates output light to a 2 degree narrow beam, and then a spreading optic may be placed on the LED/collimator to spread the output light to a different desired spread. In one such embodiment, each lamp assembly has a mounting height of 30 feet, and a distance between lamps of 6 mounting heights (180 feet), with each lamp illuminating an area slightly greater than +/−3 mounting heights up and down the roadway from the location of the lamp. In this embodiment, LEDs pointing to an area three mounting heights and greater (90+ feet) from the centerline of the lamp are not coupled with any spreading lens. LEDs pointing to an area three between 2.5 and 3 mounting heights (75 to 90 feet) from the centerline of the lamp are coupled with a spreading lens having a 5 degree spread. LEDs pointing to an area between 2 and 2.5 mounting heights (60 to 75 fees) from the centerline of the lamp are coupled with a spreading lens having a 15 degree spread. LEDs pointing to an area three between 1 and 2 mounting heights (30 to 60 feet) from the centerline of the lamp are coupled with a spreading lens having a 25 degree spread. Finally, LEDs pointing to an area three between zero and 1 mounting heights (0 to 30 feet) from the centerline of the lamp are coupled with a spreading lens having a 50 degree spread.

With reference now to FIGS. 17 through 20, a LED based lamp assembly 500 of another embodiment is described. In this embodiment, the lamp assembly 500 is a “bell” shaped assembly that includes an exterior housing 504 and an exterior lens 508. Several mounting subassemblies 512, 516, 520 are assembled within housing 504, each subassembly 512, 516, 520 having a number of different angled mounting surfaces 524 onto which LED assemblies 528 are mounted on one side, and heat dissipation devices 532 are mounted on an opposite side. The lamp assembly 500 provides light output within the area identified by dashed lines 410. LED assemblies 528, in this embodiment, are similar to the LED arrays 100 and 150 as described previously with respect to FIGS. 4 and 5. The LED assemblies 528, in this embodiment, include an array of five LED elements, arranged in a 3/2 configuration, and may include collimating or other beam shaping optics associated with the LEDs. The lamp assembly 500, of this embodiment, is designed to provide a replacement for traditional 150 Watt metal halide type architectural street lights. The LED assemblies 528 include one type of standard LED, and in one embodiment the LED is a white LED that operates at a current of approximately 500 to 600 mA and provides an output flux of approximately 170 to 250 lumens. The LED assemblies 528, of this embodiment, as mentioned above, include five LEDs, and provide tiling of the LED outputs and simplified manufacturing by allowing a five-element array to be mounted to the surface 524. However, it will be readily recognized that individual LEDs may be mounted on a surface, or arrays of LEDs having differing numbers or configurations of LEDs on the array may be employed.

In another embodiment, the LED assemblies 528, each include a collimator that collimates output light to a 2 degree narrow beam, and then a spreading optic may be placed on the LED/collimator to spread the output light to a different desired spread. In one such embodiment, each lamp assembly has a mounting height of 30 feet, and a distance between lamps of 6 mounting heights (180 feet), with each lamp illuminating an area slightly greater than +/−3 mounting heights up and down the roadway from the location of the lamp. In this embodiment, LEDs pointing to an area three mounting heights and greater (90+ feet) from the centerline of the lamp are not coupled with any spreading lens. LEDs pointing to an area three between 2.5 and 3 mounting heights (75 to 90 feet) from the centerline of the lamp are coupled with a spreading lens having a 5 degree spread. LEDs pointing to an area between 2 and mounting heights (60 to 75 fees) from the centerline of the lamp are coupled with a spreading lens having a 15 degree spread. LEDs pointing to an area three between 1 and 2 mounting heights (30 to 60 feet) from the centerline of the lamp are coupled with a spreading lens having a 25 degree spread. Finally, LEDs pointing to an area three between zero and 1 mounting heights (0 to 30 feet) from the centerline of the lamp are coupled with a spreading lens having a 50 degree spread.

As may be observed in the described embodiments, provided are luminaries that provide several features, including a positive contrast roadway lighting system having an asymmetric light distribution providing improved visibility with reduced glare. The system meets IESNA RP-8-2000 and AASHTO freeway lighting requirements and also meets a Mounting Height ratio of 5:1 or better for luminaire pole spacing. Systems of some embodiments described herein provide improved visibility with positive contrast and reduced uplight that reduces light pollution by achieving full cutoff and reducing amount of light projected upward from the luminaires. Reduced uplight is further achieved by having beams of light produced by the several light elements in a cross pattern such that any stray light from light elements is contained within lamp housings. Such reduced uplight, and reduced trespass that is provided by the more directive and targeted output pattern, greatly reduces light pollution and helps achieve "dark sky" goals that are present in many jurisdictions. Furthermore, lighting systems of several embodiments save energy by providing better lamp utilization and light output at higher vertical angles.

In another embodiment, the present disclosure provides a method for generating a desired illumination pattern from an LED based lamp. The method includes determining an illumination pattern to be implemented. The illumination pattern may be determined based on specifications for certain types of lighting applications, such as minimum lighting requirements and minimum height of lamps, etc. The illumination pattern may also be based on a custom set of criteria provided for a particular application. For example, if the lamp is to be used as a street light, there are various specification for street lighting that include minimum lighting requirements. In such cases, the relevant specification is one factor in determining an illumination pattern. Another factor in determining the illumination pattern is the height and spacing of lamp assemblies. The height and spacing of lamp assemblies may be determined based on specifications for particular applications. For example, street lighting applications may have specifications as to the maximum spacing between lamps, and minimum heights of lamps that are located over a roadway. Alternatively, the height and spacing of lamp assemblies may be determined after designing a lamp assembly and associated LED elements. For example, a lamp assembly may be designed to provide a uniform illumination over a particular area when placed at a particular height. In such a case, the spacing of lamp assemblies is determined based on the desired uniformity of lighting for the area to be illuminated.

The type, or types, of LED elements to be used in the lamp are selected, and the illumination provided by the selected LED elements is determined for different types of collimation and for different angles relative to a primary axis of the lamp assembly. The uniformity of lighting is determined, including a minimum flux level for the area to be illuminated. Next, a lamp surface is determined that includes a number of different mounting surfaces having different angles with respect to the primary axis, such that when LEDs are mounted to the mounting surfaces, the lamp will provide the desired illumination pattern with the desired uniformity. The intensity and beam angle of the light output from LED elements is selected to provide a uniform angular intensity.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A lamp assembly, comprising:

a housing having a plurality of mounting surfaces, the plurality of mounting surfaces comprising surfaces having a plurality of different angles relative to a first plane that is parallel to a surface that is to be illuminated by the lamp assembly, the mounting surfaces comprising at least a first plurality of mounting surfaces and a second plurality of mounting surfaces each having a plurality of solid state light elements mounted therein, wherein the first plurality of mounting surfaces having smaller angles relative to a second plane than the second plurality of mounting surfaces, wherein the second plane is perpendicular to the first plane and intersects a centerline of the housing having the first and second plurality of solid state elements; and at least a subset of the plurality of light elements providing light output along a respective primary axis that intersects the second plane, the output of the plurality of solid state light elements combining to provide a synthesized illumination pattern, wherein an angular intensity of at least each of the subset of the plurality of solid state light elements is determined in each of the first and the second plurality of mounting surface based on the plurality of different angles of intersection of the primary axis of each respective light element and the second plane.

2. The lamp assembly of claim 1, wherein at least one of the plurality of solid state light elements comprise a collimating component that collimates light produced by the associated solid state light element.

3. The lamp assembly of claim 2, wherein the collimating component collimates light output by the solid state light element to a beam angle of 5° or less.

4. The lamp assembly of claim 3, wherein each of the solid state light elements includes a collimating component that collimates light output by the solid state light element to a beam angle of about 2°.

5. The lamp assembly of claim 1, wherein additional beam steering optics are not required in order to generate the synthesized illumination pattern.

6. The lamp assembly of claim 1, wherein the solid state light elements are light emitting diodes.

7. The lamp assembly of claim 1, wherein light provided by the solid state lighting element is collimated to provide an angular intensity that is equivalent to the angular intensity of the other of the plurality of solid state lighting elements.

8. The lamp assembly of claim 1, wherein the illumination pattern of the lamp assembly has a uniformity greater than uniformity provided by incandescent or gas discharge lamps.

9. The lamp assembly of claim 1, wherein the illumination pattern is asymmetrical relative to the lamp assembly.

10. The lamp assembly of claim 1, wherein the mounting surfaces comprise a first plurality of mounting surfaces and a second plurality of mounting surfaces, the first plurality of mounting surfaces having, on average, smaller angles relative to the second plane than the second plurality of mounting surfaces.

11. The lamp assembly of claim 10, wherein solid state lighting elements mounted on the first plurality of mounting surfaces provide illumination for a first area of the illumination pattern, and solid state lighting elements mounted on the second plurality of mounting surfaces provide illumination for a second area of the illumination pattern.

12. The lamp assembly of claim 11, wherein the first area is larger than the second area.

13. A solid state lamp assembly, comprising: a plurality of solid state light elements mounted to the lamp assembly, the lamp assembly configured to provide an illumination pattern and having a primary axis extending from the lamp assembly to a surface to be illuminated by the lamp assembly;

a mounting surface comprising at least a first plurality of mounting surfaces and a second plurality of mounting surfaces each having a plurality of solid state light elements mounted therein, wherein the first and second plurality of mounting surfaces each having a plurality of different angles relative to a first plane, and wherein the first plurality of mounting surfaces have smaller angles relative to the first plane than the second plurality of mounting surfaces, the light output of the plurality light elements configured to provide a synthesized illumination pattern, with a plurality of solid state light elements mounted on the first and second plurality of mounting surfaces each providing light output along an output axis that is normal to the mounting surface, the output axis of at least a subset of the plurality of the solid state light elements intersecting a second plane containing the primary axis and a centerline of the lamp assembly; and a plurality of secondary optics mounted to at least a subset of the plurality of solid state light elements, each of the secondary optics configured to collimate the light output of the corresponding solid state light element, and wherein the secondary optic for a particular light element is selected to provide an angular intensity of the light output from the solid state light element that is based on the respective angle of the plurality of different angles of intersection of the light output and the primary axis.

14. The lamp assembly, as claimed in claim 13, wherein the mounting surface comprises more than five different angles relative to the primary axis.

15. The lamp assembly, as claimed in claim 13, wherein the mounting surface comprises more than 10 different angles relative to the primary axis.

16. The lamp assembly, as claimed in claim 13, wherein the secondary optics collimate light output from the light elements to beam angles of less than 5°.

17. The lamp assembly, as claimed in claim 13, wherein the secondary optics are selected to provide uniform angular intensity throughout all of the different angles of the mounting surfaces.

18. The lamp assembly, as claimed in claim 13, wherein the output pattern is asymmetrical relative to a center-line of the lamp assembly.

19. The lamp assembly, as claimed in claim 18, wherein the asymmetrical output pattern includes a first illumination area and a second illumination area that is smaller than the first illumination area.

20. The lamp assembly, as claimed in claim 18, wherein the asymmetrical output pattern includes a first illumination area and a second illumination area that is the same area as the first illumination area.

21. The lamp assembly, as claimed in claim 20, wherein the first illumination area is offset from the second illumination area.

22. A lamp assembly, comprising:

a housing having a primary axis extending from the lamp assembly to a surface to be illuminated by the lamp assembly, the housing comprising a plurality of mounting surfaces comprising at least a first plurality of mounting surfaces and a second plurality of mounting surfaces each having a plurality of solid state light elements mounted therein, wherein the first and second plurality of mounting surfaces each having a plurality of different angles relative to a first plane, wherein the first plurality of mounting surfaces have smaller angles relative to the first plane than the second plurality of mounting surfaces, the light output of the plurality light elements configured to provide a synthesized illumination pattern;

a plurality of collimating components mounted to at least a subset of the plurality solid state light elements that collimate light output from respective light elements; and a plurality of spreading optics mounted to at least a subset of the collimating components that spread the light output from the collimating component to a beam width selected based on a distance from the respective one of the plurality of solid state light elements to an object to be illuminated by the plurality of solid state light elements and an angle of intersection between the corresponding beam and the primary axis, wherein an angular intensity is determined for at least a subset of the plurality of solid state light elements of each of the first and second plurality of mounting surfaces based on the plurality of different angles of intersection of the primary axis of each respective light element and the first plane.

23. The lamp assembly of claim 22, wherein each of the plurality of solid state light elements provides a beam of light, the plurality of beams from the plurality of solid state light elements combining to provide a synthesized illumination pattern.

24. The lamp assembly, as claimed in claim 22, wherein the mounting surface comprises more than five different angles relative to the primary axis.

25. The lamp assembly, as claimed in claim 22, wherein the mounting surface comprises more than 10 different angles relative to the primary axis.

26. The lamp assembly, as claimed in claim 22, wherein the collimating components collimate light output from the light elements to beam angles of less than 5°.

27. A computer-implemented method for generating a desired illumination pattern from a solid state lighting assembly, comprising:

modeling, at a computer, light output from a plurality of different solid state light elements as a vector having a direction and a length, the direction of each vector determined based on the pointing of a central lobe of the respective light element output, and the length of each vector determined based on an intensity of peak illumination of the light element;

determining a desired intensity pattern that is to be output from the lighting assembly;

determining, using the computer, the direction and length of a plurality of pointing vectors to achieve the desired intensity pattern; and determining, using the computer, a configuration of a plurality of mounting surfaces in a housing for the lighting assembly based on the determined direction and length of the plurality of pointing vectors, the mounting surfaces comprising at least a first plurality of mounting surfaces and a second plurality of mounting surfaces each having a plurality of solid state light elements mounted therein, wherein the first and second plurality of mounting surfaces each having a plurality of different angles relative to a first plane, wherein the first plurality of mounting surfaces have smaller angles relative to the first plane than the second plurality of mounting surfaces, the light output of the light elements configured to provide a synthesized illumination pattern, wherein the desired intensity pattern is determined for at least a subset of the plurality of solid state light elements of each of the first and second plurality of mounting surfaces based on the plurality of different angles of intersection of the pointing vector of each respective light element and the first plane.

28. The method of claim 27, wherein a solid state lighting element and associated collimating element are selected for each mounting surface based on the length of the associated pointing vector.

29. The method of claim 28, wherein an angle of the surface to which the lighting element is mounted is determined based on the direction of the associated pointing vector.

30. The method of claim 27, wherein the desired intensity pattern has a uniformity of density of greater than uniformity provided by incandescent or gas discharge lamps.

31. The method of claim 27, wherein the pointing vectors include vectors in at least five different directions.

32. The method of claim 27, wherein the pointing vectors include vectors in at least ten different directions.

33. The method of claim 27, wherein a solid state lighting element and associated collimating element are selected to provide an angular intensity that is uniform across the plurality of light elements.

* * * * *